United States Patent
Struttmann

[11] 3,829,182
[45] Aug. 13, 1974

[54] BEARING CONSTRUCTION
[75] Inventor: Hilarius S. Struttmann, St. Charles, Ill.
[73] Assignee: Borg-Warner Corporation, Chicago, Ill.
[22] Filed: May 21, 1973
[21] Appl. No.: 362,572

[52] U.S. Cl. ............................................. 308/194
[51] Int. Cl. ........................................... F16c 23/08
[58] Field of Search ....................... 308/236, 194, 72

[56] References Cited
UNITED STATES PATENTS
2,553,337  5/1957  Shafer .............................. 308/194

Primary Examiner—Charles J. Myhre
Assistant Examiner—Frank Susko
Attorney, Agent, or Firm—Donald W. Banner

[57] ABSTRACT

A generally spool-shaped locking pin preferably constructed of a ductile metal in a two part outer race assembly for a self-aligning bearing assembly limits the relative rotation between race assembly and the housing receiving the same.

3 Claims, 6 Drawing Figures

PATENTED AUG 13 1974

PATENTED AUG 13 1974 3,829,182
SHEET 2 OF 2

BEARING CONSTRUCTION

BACKGROUND OF THE INVENTION

Locking pins have been used with anti-friction bearings for a number of years. They function to materially reduce or eliminate rotation between the outer race means and the housing receiving the outer race means. Generally, locking pins consist of a loose pin dropped in a hole counter bored in the outer race means. With this arrangement, locking of the bearing is dependent upon a mechanic inserting the pin when assemblying the bearing. Because the pin is dropped in a hole, it is easy for the pin to become loose and/or forgotton during the assembly of the bearing.

THE INVENTION

This invention relates particularly to bearing assemblies in which the outer race is constructed of two substantially like parts joined together. When assembled in a pillow-block or housing, the resultant bearing is self-aligning, i.e., limited movement is permitted between the bearing and the pillow to compensate for shaft misalignment.

A locking pin according to this invention comprises a generally spool-shaped member having a cylindrical or conical, reduced central portion which is received in an opening formed by the assembly of the race parts. One of the enlarged terminal ends of the pin extends outwardly of the outer race. The remainder is retained in a complementary shaped hole in the race assembly.

If the extending portion of a pin with a conical shank is sheared off, the remainder of the pin is retained in the race assembly and does not fall into the bearing.

THE DRAWINGS

DETAILED DESCRIPTION

Figure 1:
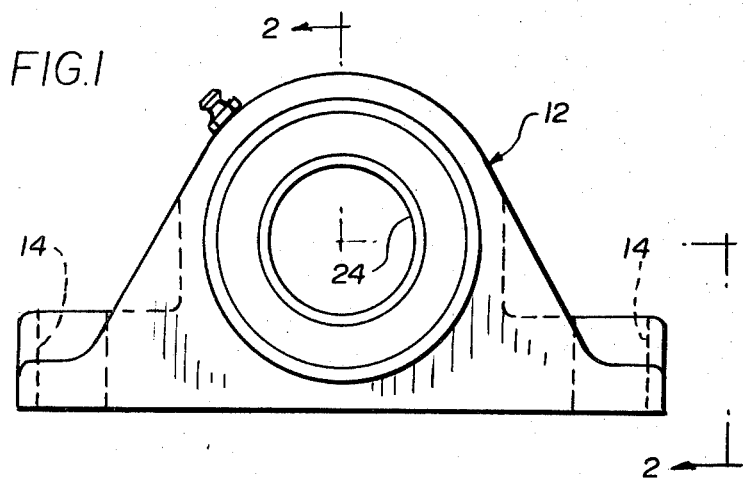
FIG. 1 is an elevation of one form of bearing using a solid pillow block of housing.
Figure 2:
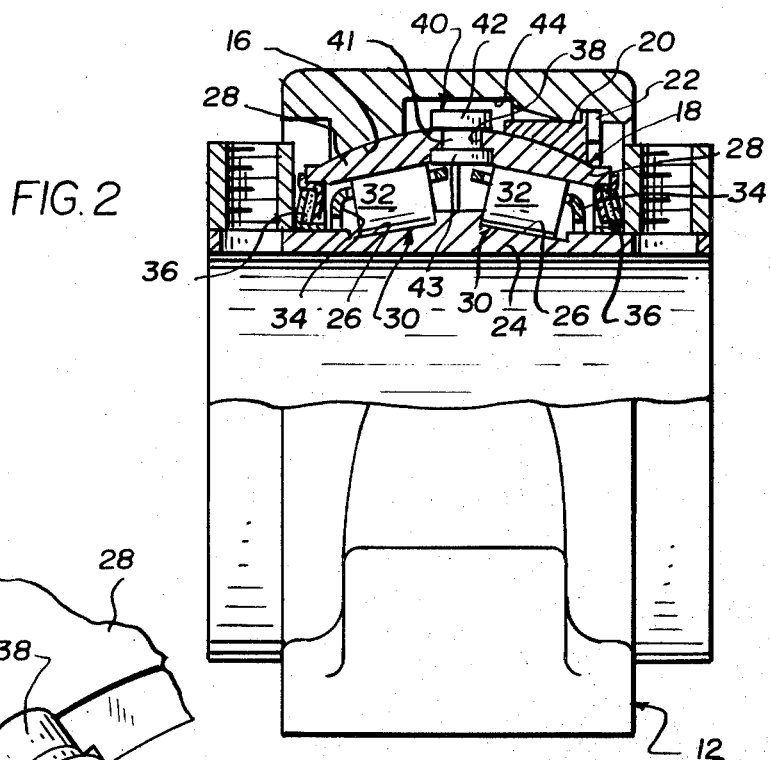
FIG. 2 is a sectional view taken on line 2—2 of FIG. 1 and particularly illustrating the invention.
Figure 3:
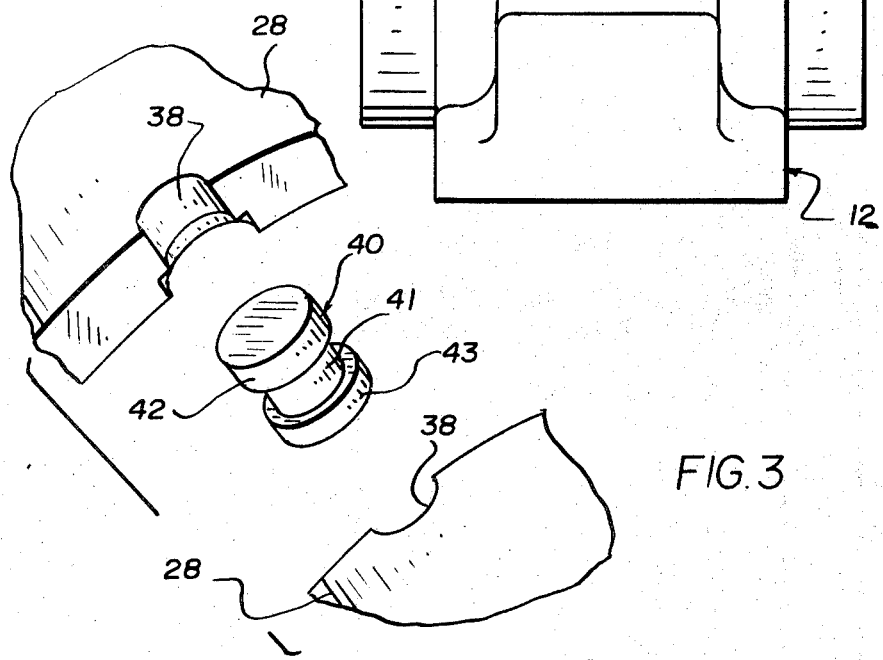
FIG. 3 is a perspective view of a locking pin as used in FIG. 2 showing its relation to the outer race parts during the assembly thereof.

With reference to FIGS. 1, 2, and 3, there is illustrated a self-aligning bearing assembly which includes a solid pillow block 12 having holes 14 for receiving bolts (not shown) to bolt it to a support for use. The pillow block has a central opening 16 to receive a bearing cartridge 18 which is retained therein by means of a ring member 20 and a locking snap ring 22.

The cartridge 18 includes an inner race 24 having spaced raceways 26,26, an outer race 28, pairs of roller bearing elements 30, the rollers 32 of which are spaced by means of retainers 34. Lubricant seals 36 are between the inner and outer races.

The outer race 28 is constructed of two like parts joined at the center (see FIG. 3) and is provided with at least one counter bored opening 38 to receive a generally spool-shaped locking pin 40 having a reduced cylindrical section 41 and enlarged terminal ends 42, 43. As can be seen the pin 40 is clamped in the race assembly during assembly of the bearing cartridge with one enlarged terminal end 42 extending outwardly of the assembly and when the bearing cartridge 18 is in the pillow block 12 the end 43 of the pin 40 is within a cavity 44 formed in the pillow block. Because the cavity 44 is limited in extent, undesirable rotation between the outer race and the pillow block is effectively controlled.

During assembly of the cartridge 18, the outer race parts are assembled with the pin 40 and are suitably joined together. Generally, the race parts are welded or other secured in assembled relationship.

Figure 4:
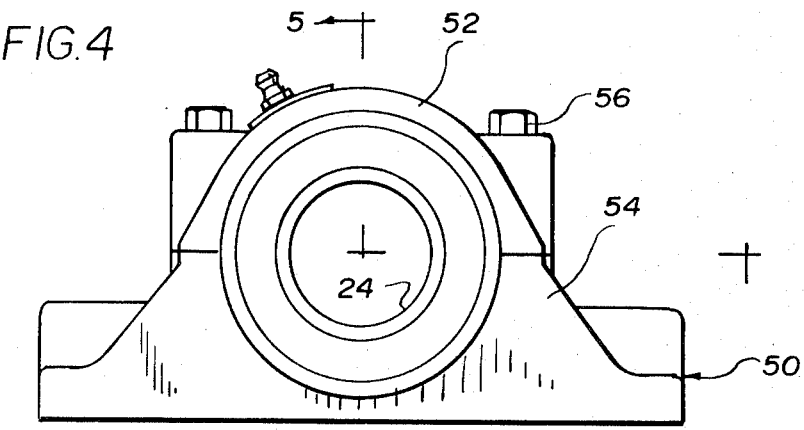
FIG. 4 is a view similar to FIG. 1, but illustrating a different type of pillow block or housing.
Figure 6:
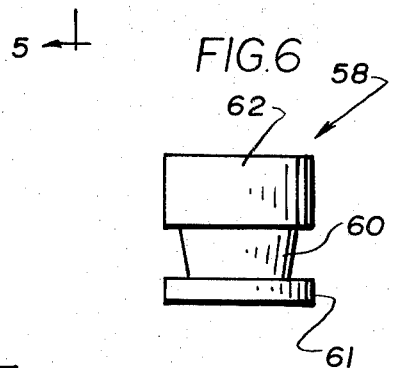
FIG. 6 is an elevation view of the locking pin of FIG. 5.
Figure 5:
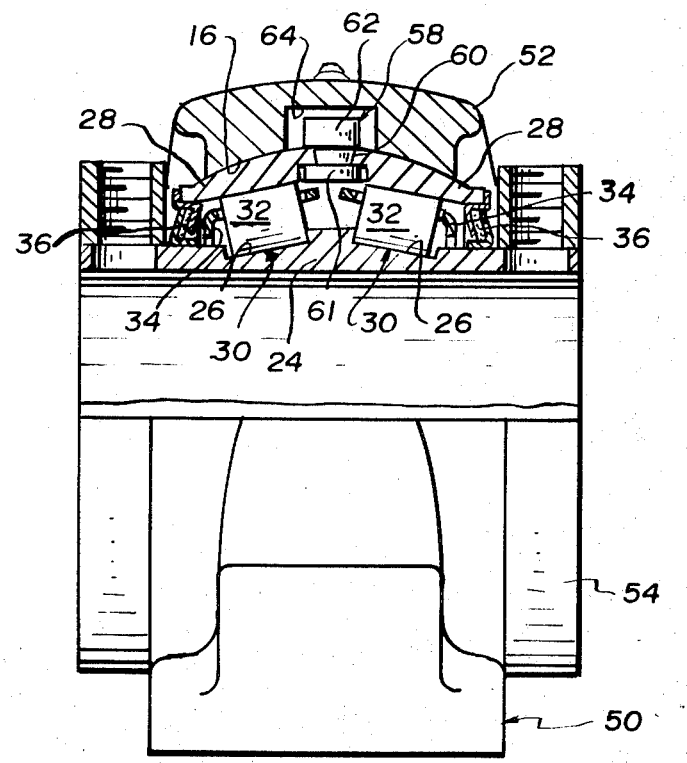
FIG. 5 is a sectional view taken on line 5—5 of FIG. 4 illustrating a different form of locking pin.

FIGS. 4, 5, and 6 illustrate a different form of pillow, i.e., one split which will be identified as 50 which is formed of two pieces 52 and 54 joined by bolts 56. As will be understood, this construction eliminates the ring member and the locking snap ring of the previous embodiment. The bearing construction is substantially the same except for the shape of the generally spool-shaped locking pin 58 which has a conical central section 60 instead of the cylindrical section 41. The pin 58 has enlarged terminal ends 61, 62, the end 62 extending into a cavity 64 in the pillow block. The cavity 64 corresponds to the cavity 44 of the previous embodiment.

The locking pin 58 is assembled with the outer race parts as previously described. In the event that the enlarged portion 62 of the pin is sheared off, the remainder remains in its illustrated position.

Generally, the locking pin is a ductile metal; it could be a plastic pin, such as "Teflon" or the like if desired. Also, a similar pin could be constructed as a blind rivet and inserted after assembly of the bearing cartridge.

I claim:

1. In a bearing assembly comprising a housing, inner and outer races with inner and outer raceways, bearings interposed between said races in rolling contact with the raceways, said outer race being constructed of two parts joined together, an opening provided in said outer race, generally a spool-shaped locking pin in said opening having one enlarged terminal portion extending therefrom, a recess in the housing for receiving said extending pin portion, said pin also having a reduced waist portion, and another enlarged terminal portion said housing opening being shaped complementary to the shape of the reduced waist portion and the other enlarged terminal portion of the pin, said pin effectively limiting relative rotation between said outer race and said housing.

2. In a bearing assembly as recited in claim 1 wherein the waist portion is conical.

3. In a bearing assembly as recited in claim 1 wherein the waist portion is cylindrical.

* * * * *